G. M. HART.
COTTON CHOPPER.
APPLICATION FILED JUNE 18, 1909.
986,285.
Patented Mar. 7, 1911.
3 SHEETS—SHEET 1.
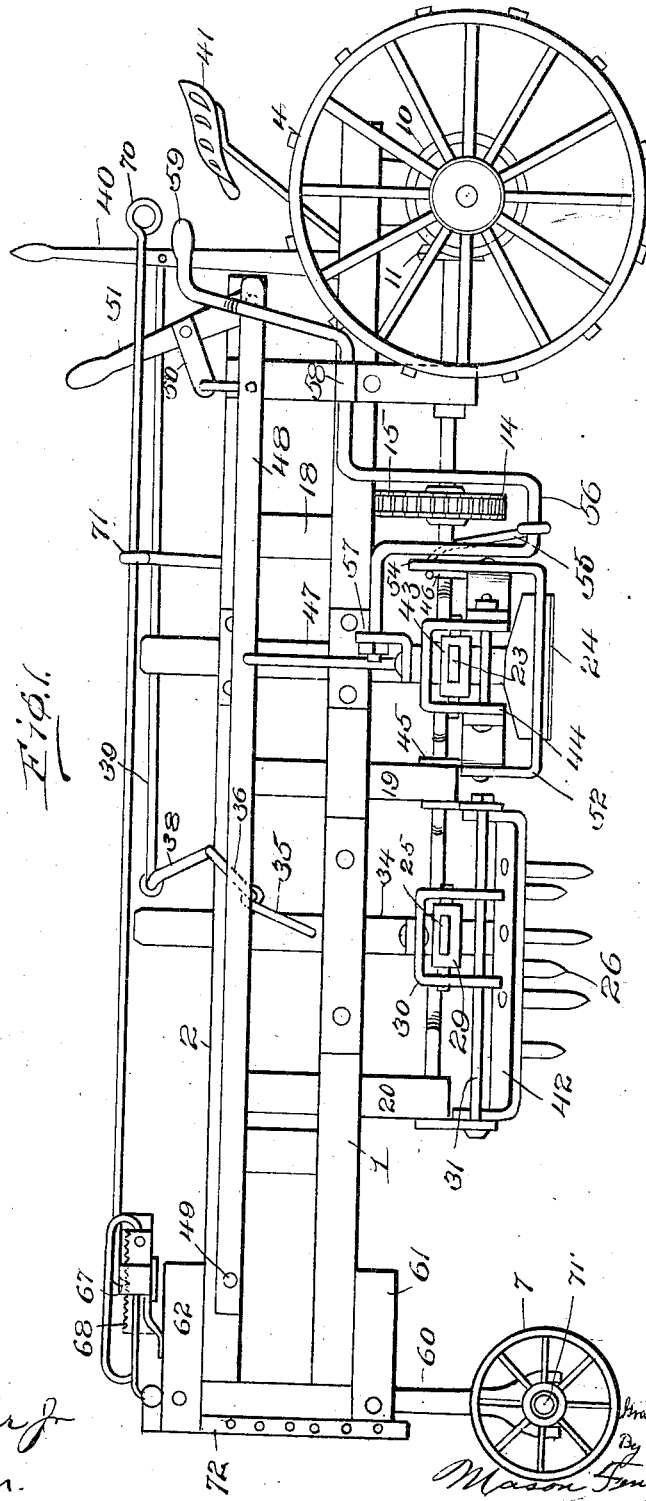
Witnesses
J. M. Fowler Jr.
A. S. Kitchin.
Inventor
Granville M. Hart
By Mason Fenwick & Lawrence
his Attorneys

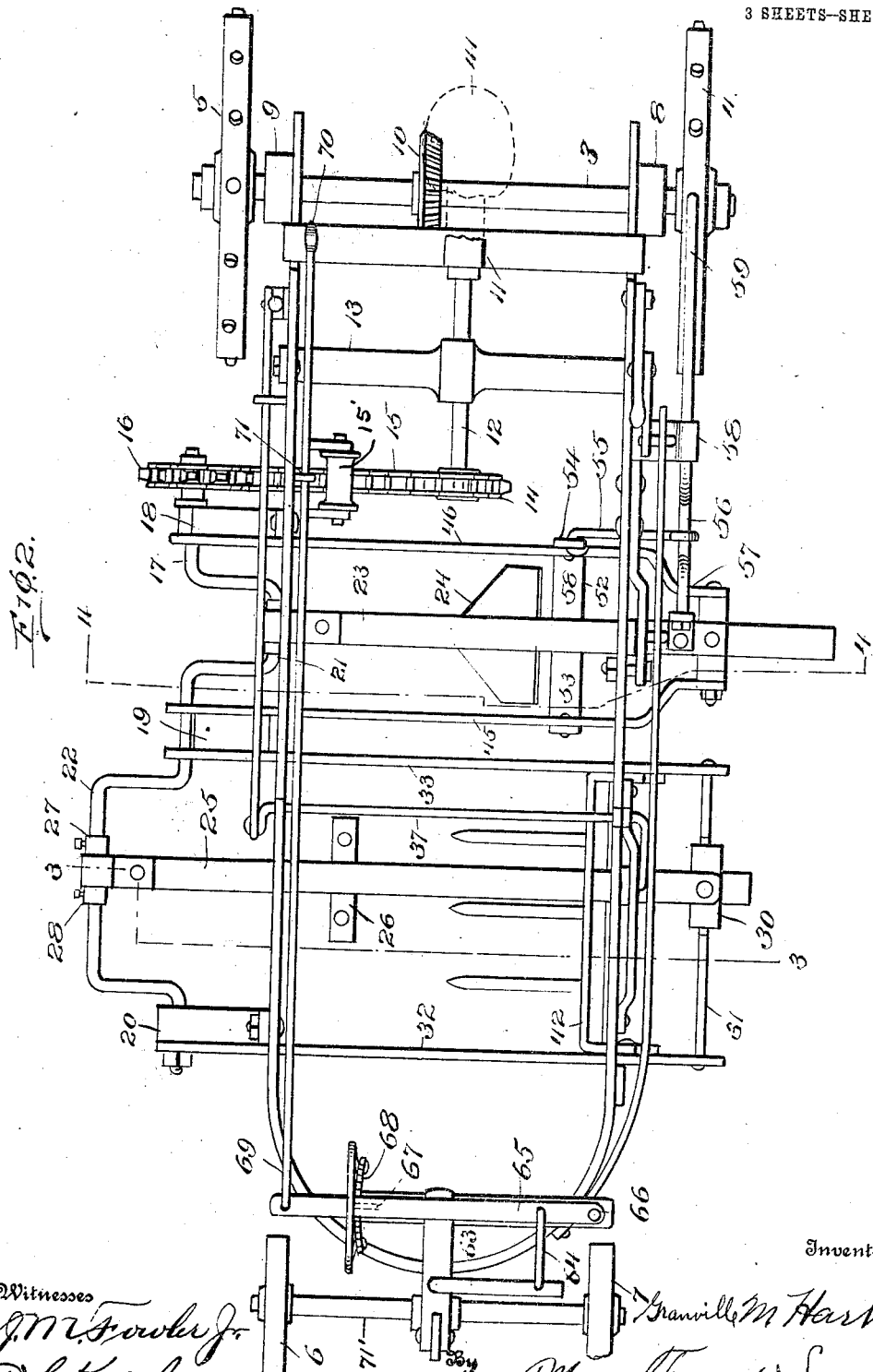

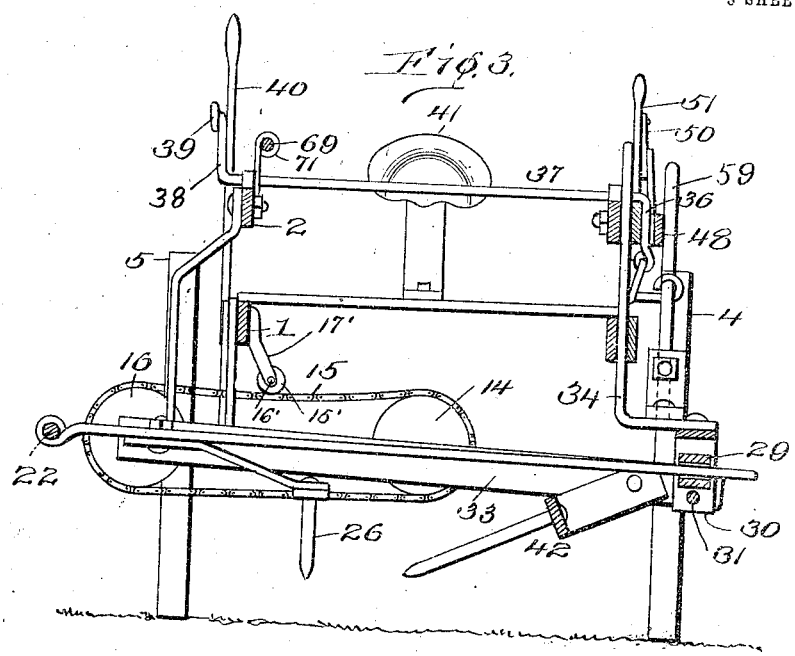
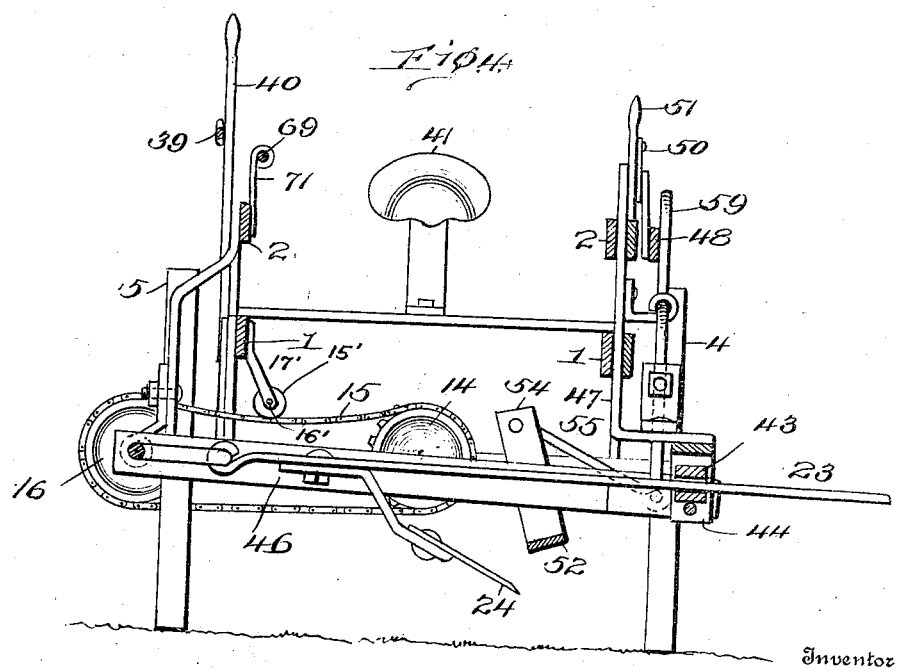

UNITED STATES PATENT OFFICE.

GRANVILLE M. HART, OF PLANO, TEXAS.

COTTON-CHOPPER.

986,285. Specification of Letters Patent. Patented Mar. 7, 1911.

Application filed June 18, 1909. Serial No. 503,041.

*To all whom it may concern:*

Be it known that I, GRANVILLE M. HART, a citizen of the United States, residing at Plano, in the county of Collin and State of Texas, have invented certain new and useful Improvements in Cotton-Choppers; and I do hereby declare the following to be a full, clear, and exact description of the invention, such as will enable others skilled in the art to which it appertains to make and use the same.

This invention relates to improvements in combined cotton choppers and cultivating means, and has for an object the arrangement of a hoe or chopper for thinning the cotton, and a toothed rake or auxiliary hoe for cultivating and removing vegetation from around the cotton not removed by the hoe or chopper.

Another object of the invention is the arrangement of a solid hoe and a toothed hoe for alternately removing vegetation and removing a part of the cotton.

Another object of the invention is the arrangement of a solid hoe for removing part of the cotton or thinning the same, and a toothed hoe for cultivating the cotton not removed by the solid hoe, in combination with a scraper for the solid hoe and a scraper for the toothed hoe for cleaning the respective hoes.

A still further object of the invention is the arrangement of a machine adapted to be drawn across the field astride of a row of cotton, formed with a solid hoe for engaging the ground and removing the cotton at predetermined intervals, and a toothed hoe for cleaning away vegetation from around the cotton left by the solid hoe, both hoes being self-cleaning and arranged to be adjusted instantly at any time.

With these and other objects in view the invention comprises certain novel constructions, combinations and arrangement of parts as will be hereinafter more fully described and claimed.

In the accompanying drawings: Figure 1 is a side elevation of the machine, embodying the invention. Fig. 2 is a top plan view of the structure shown in Fig. 1. Fig. 3 is a section through Fig. 2 on line 3—3. Fig. 4 is a section through Fig. 2 on line 4—4.

Referring to the drawing by numerals, 1 indicates a lower frame and 2 an upper frame connected by a plurality of cross members and supported upon axle 3 carrying traction wheels 4 and 5. The front ends of the frames 1 and 2 are supported by wheels 6 and 7 and connecting mechanism hereinafter more fully described. The lower frame 1 is connected with journal members 8 and 9 which members permit a free rotation of axle 3. Wheels 4 and 5 are rigidly secured to axle 3 so as to positively rotate the same when the machine is being moved. Axle 3 has rigidly secured thereto a beveled gear 10 meshing with beveled gear 11, which is rigidly secured to a shaft 12. Shaft 12 is journaled in a cross bar 13 which in turn is rigidly secured to frames 1 and 2 and acts as a brace therefor. Shaft 12 carries at the end opposite gear 11 a sprocket 14 for accommodating a chain 15 which passes over a second sprocket 16 rigidly secured to a crank shaft 17. Positioned on the chain 15 is a tension roller 15' mounted on a shaft 16' journaled in the lower ends of the extensions 17' which are secured to one of the lower frame bars. Crank shaft 17 is supported by brackets 18, 19 and 20, which are secured to frames 1 and 2. Crank shaft 17 is formed with crank members 21 and 22, crank member 21 having pivotally connected therewith a pitman 23 which carries a solid hoe 24, and crank member 22 having pivotally connected therewith a pitman 25 that carries a toothed hoe 26, crank members 21 and 22 being arranged to work in opposition to each other. Pitman 23 is designed to be mounted so as to operate without lateral adjustment in frames 1 and 2, while pitman 25 is mounted so as to be adjustable toward or from pitman 23, in order to vary the action of hoe 26 in respect to hoe 24. In order to permit this adjustment, crank member 22 is made comparatively long and has mounted thereon sleeves 27 and 28 which are adjustable thereon. Sleeves 27 and 28 may be rigidly held in place by any desired means, as for instance by set screws, so as to hold pitman 25 from any lateral movement, but permit a free pivotal movement thereof. The end of pitman 25 opposite crank member 22 passes through a pivotally mounted guiding member 29 which is pivoted in a guiding frame 30 which in turn is slidably mounted upon a rod 31. Rod 31 is connected to cross bars 32 and 33, which are pivotally mounted upon crank shaft 17, and may be adjusted up or down by the up and down movement of adjusting rod 34. Rod 34 has a link 35 connected therewith, which in turn is connected with a crank arm 36. Crank arm 36 is formed integral with or rigidly connected with a cross bar 37 and has formed on the opposite side thereof a crank 38 (Fig. 1), to which is pivotally secured a link 39. Link 39 is pivotally connected with a lever 40, which is adapted to be operated by an operator upon seat 41. By this means whenever the operator on seat 41 desires to raise or lower the framework, comprising cross bars 32 and 33, all that will be necessary is to move lever 40 forward or backward. As the toothed hoe operates, this adjustment will vary the distance which the teeth will engage the earth for either cultivating the soil or merely removing the trash and vegetation above the earth. Connected with bars 32 and 33 is a toothed cleaner 42 which is designed to remove the dirt and trash from hoe 26 at each complete cycle thereof. Cleaner 42 is raised and lowered together with bars 32 and 33 so as to be always in proper relationship to hoe 26.

The pitman 23 of solid hoe 24 is slidably mounted at its outer end in a pivotal bearing 43. Bearing 43 is pivotally mounted in a framework 44 which in turn is pivotally connected to bars 45 and 46 which extend across the machine and are pivotally mounted upon crank shaft 17. Framework 44 is connected with an adjustable sliding bar 47 which is pivotally connected with a lever 48. Lever 48 is pivotally connected at 49 to frame 2 at one end and to a link 50 at the opposite end. Link 50 is pivotally connected with a lever 51 so that whenever lever 51 is moved forward or rearward bar 47 will be raised and lowered for controlling the elevation of hoe 24.

In connection with solid hoe 24 a cleaner 52 is provided for scraping off any dirt or foreign matter therefrom upon each movement thereof. Cleaner 52 is pivotally mounted at 53—53 upon bars 45 and 46. The cleaner 52 is formed with an arm 54 which has pivotally connected therewith a link 55 which in turn is connected with a crank 56. Crank 56 is journaled in bearings 57 and 58, and has formed on the outer end thereof a handle 59 which may be grasped by the operator upon seat 41 for moving cleaner 52 toward or from hoe 24.

By the construction and arrangement of means set forth, whenever the machine is drawn across the field astride of a row of cotton power will be transmitted from wheels 4 and 5 to the hoes 24 and 26 which will clean, and also thin the cotton by removing short sections thereof. The movement of the hoes is on the order of the movement of an ordinary hoe in use by a person, so as to give a shearing action for cutting away the matter desired to be moved.

If desired an ordinary draft appliance may be provided at the front end of the machine, to which may be secured any desired power for moving the machine across the field. An upright 60 which is pivotally secured in brackets 61 and 62 has an arm 63 connected therewith, to which is secured a link 64. Link 64 is pivotally mounted to lever 65 pivoted at 66. Lever 65 has projecting from the lower side thereof a projection or tooth 67 for engaging the teeth in rack 68 for holding lever 65 in any desired position. A connecting and operating bar 69 is pivotally connected with lever 65 and extends to the rear of the machine and is formed with a gripping member 70 in proximity to the seat 41. Rod 69 passes through a guiding member 71 which also may be used as a fulcrum by which lever 65 may be raised out of engagement with rack 68 so as to be more freely movable therefrom. By this arrangement whenever the machine is not correctly located over a row of cotton the operator on seat 41 may move gripping member 70, and transmit motion to upright 60, and from thence to axle 71' to which it is secured. Axle 71' carries wheels 6 and 7 which support the forward end of the machine. As the axle 71' is moved pivotally by these means wheels 6 and 7 are set at an angle to the general direction of the chopper, so that a continued movement of the machine will move the same laterally until the machine is moved back to its correct position, after which the axle is again turned to take a position at right angles to the row of cotton in order that the further movement of the machine will be correctly over the row of cotton. By this means any slight lateral movement of the machine desired may be accomplished without changing the drafting power.

Connected with brackets 61 and 62 is a hitching bar 72 to which may be secured the power for drawing the machine across the field. Hitching bar 72 is provided with a plurality of apertures for hitching the power at any desired height as occasion may require.

What I claim is:

1. In a cotton chopper, a framework, a plurality of wheels for supporting said framework, some of said wheels acting as power wheels, a solid hoe connected with said power wheels and adapted to engage the earth, a toothed hoe also connected with said power wheels and arranged to operate alternately with said solid hoe, and means for adjusting the toothed hoe from and toward the solid hoe.

2. In a cotton chopper, a framework, a plurality of wheels for supporting said framework, some of said wheels acting as power wheels, a solid hoe, a toothed hoe, a crank shaft connected with said power wheels, means connecting the solid hoe with the crank shaft, independent means connecting the toothed hoe with the crank shaft, and means for slidably adjusting on the crank shaft, the crank connection of the toothed hoe, away from and toward the solid hoe.

3. In a cotton chopper, a framework, a plurality of wheels for supporting said framework, some of said wheels acting as power wheels, a solid hoe connected with said power wheels and adapted to engage the surface of the ground, a scraper therefor adapted to clean the hoe upon each movement of the hoe, a toothed hoe also connected with said power wheels and adapted to engage the surface of the ground, a cleaner for the toothed hoe adapted to operate at each stroke of said toothed hoe, and means for adjusting the said toothed hoe away from and toward the solid hoe.

4. In a cotton chopper, a framework, a plurality of wheels for supporting said framework, some of said wheels acting as power wheels, a reciprocating bar, a solid hoe supported upon said reciprocating bar, a second reciprocating bar, a toothed hoe supported upon said second reciprocating bar, a crank shaft connected with said power wheels and the reciprocating bars, an adjustable scraper for cleaning the solid hoe at each stroke of the solid hoe, a toothed cleaner for cleaning said toothed hoe at each stroke of the toothed hoe, and means for slidably adjusting the toothed hoe, together with its reciprocating bar, away from and toward the solid hoe.

In testimony whereof I affix my signature in presence of two witnesses.

GRANVILLE M. HART.

Witnesses:
C. W. STOCKBURGER,
J. O. ARNOLD.

---

Copies of this patent may be obtained for five cents each, by addressing the "Commissioner of Patent Washington, D. C."